May 9, 1933.  S. SUNDERLAND ET AL  1,908,195
MACHINE FOR GENERATING THE TEETH OF WHEELS
Filed Feb. 27, 1931   5 Sheets-Sheet 1
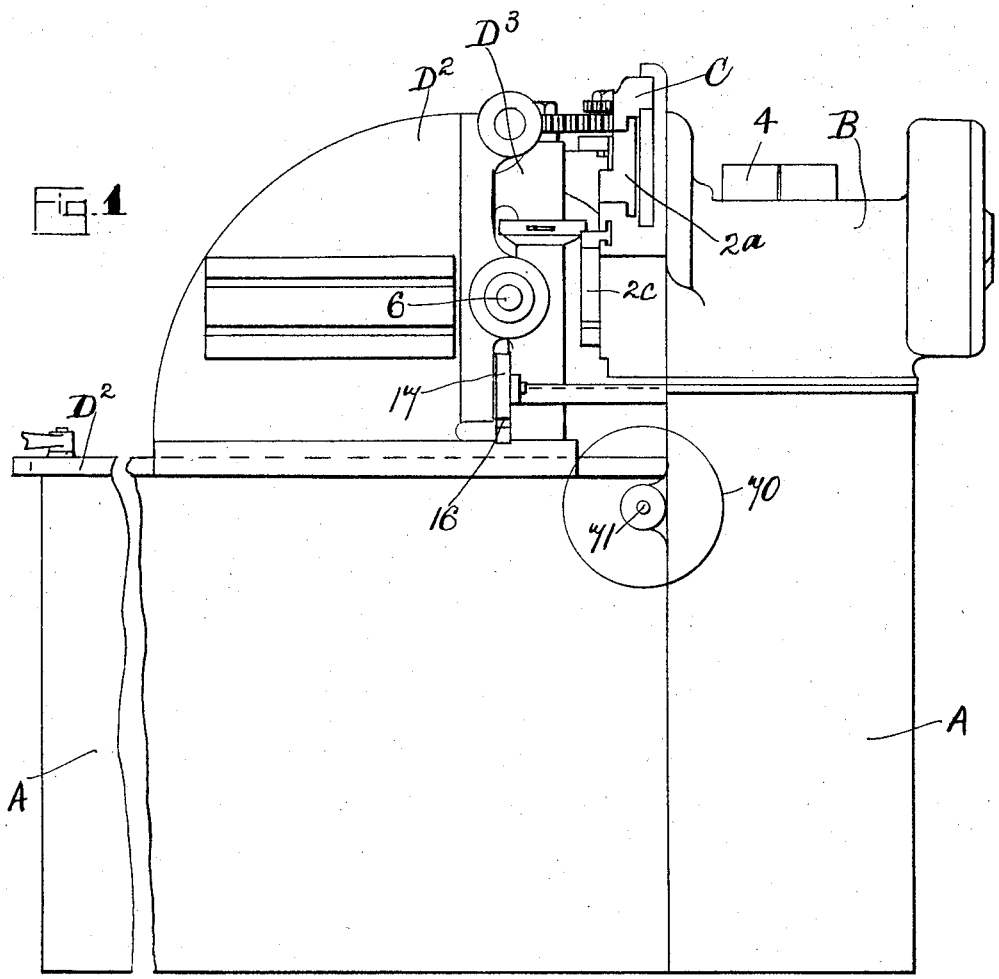
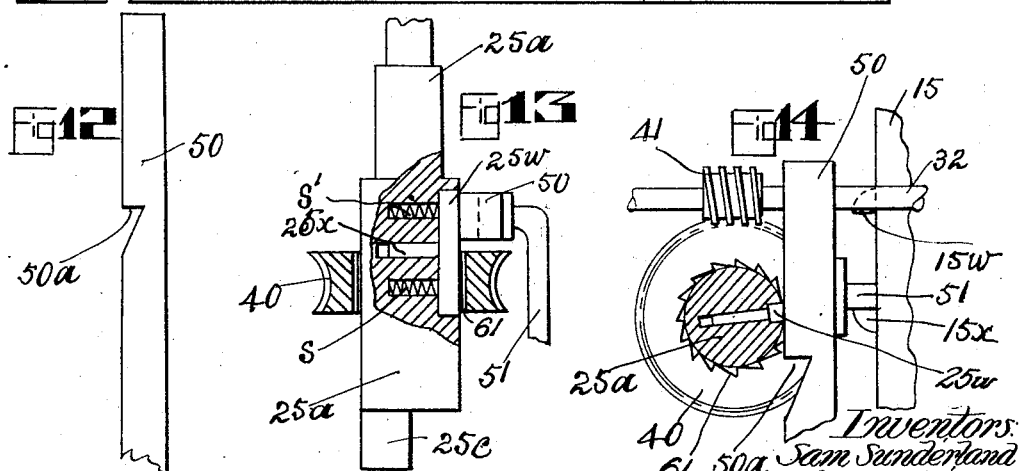

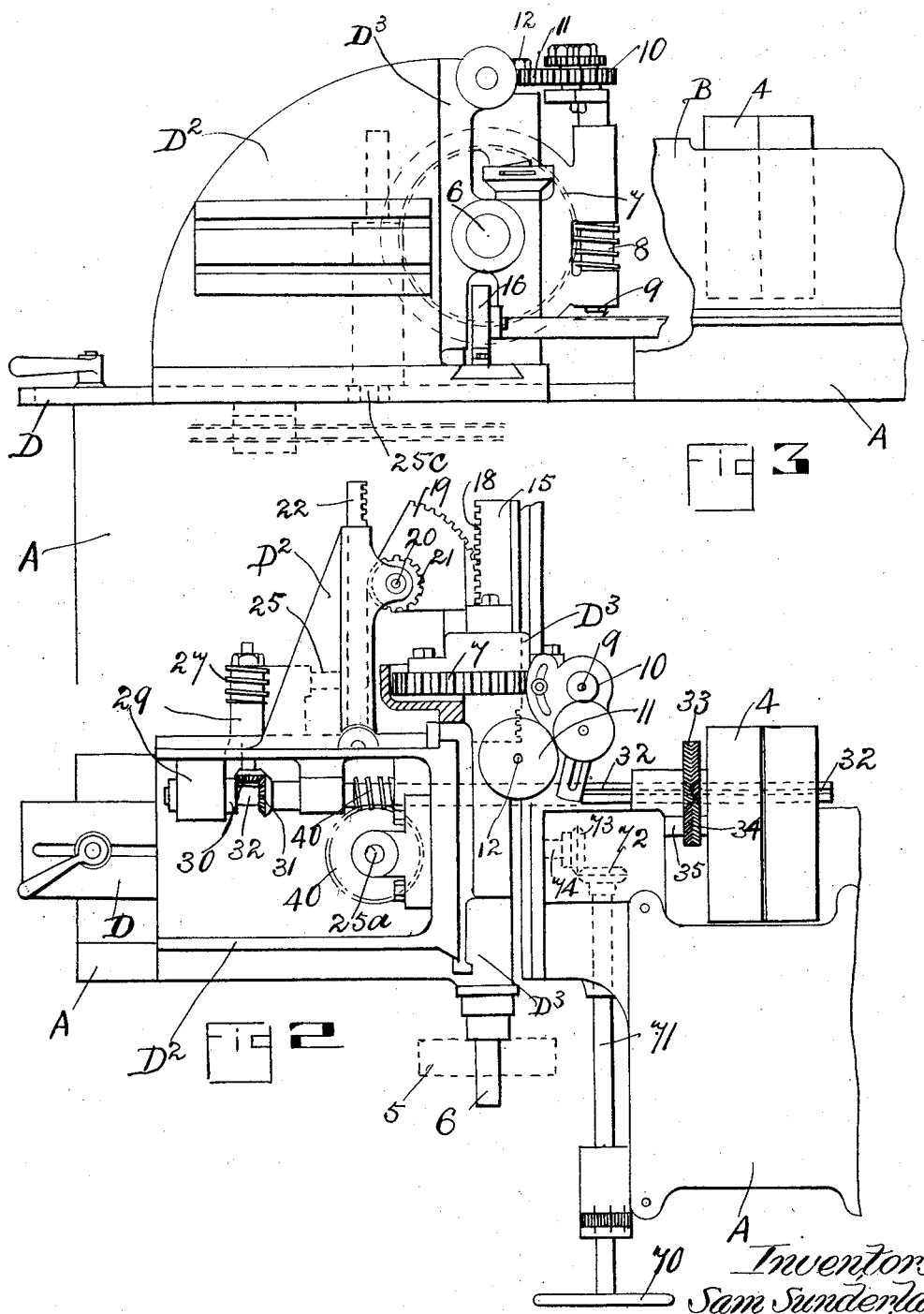

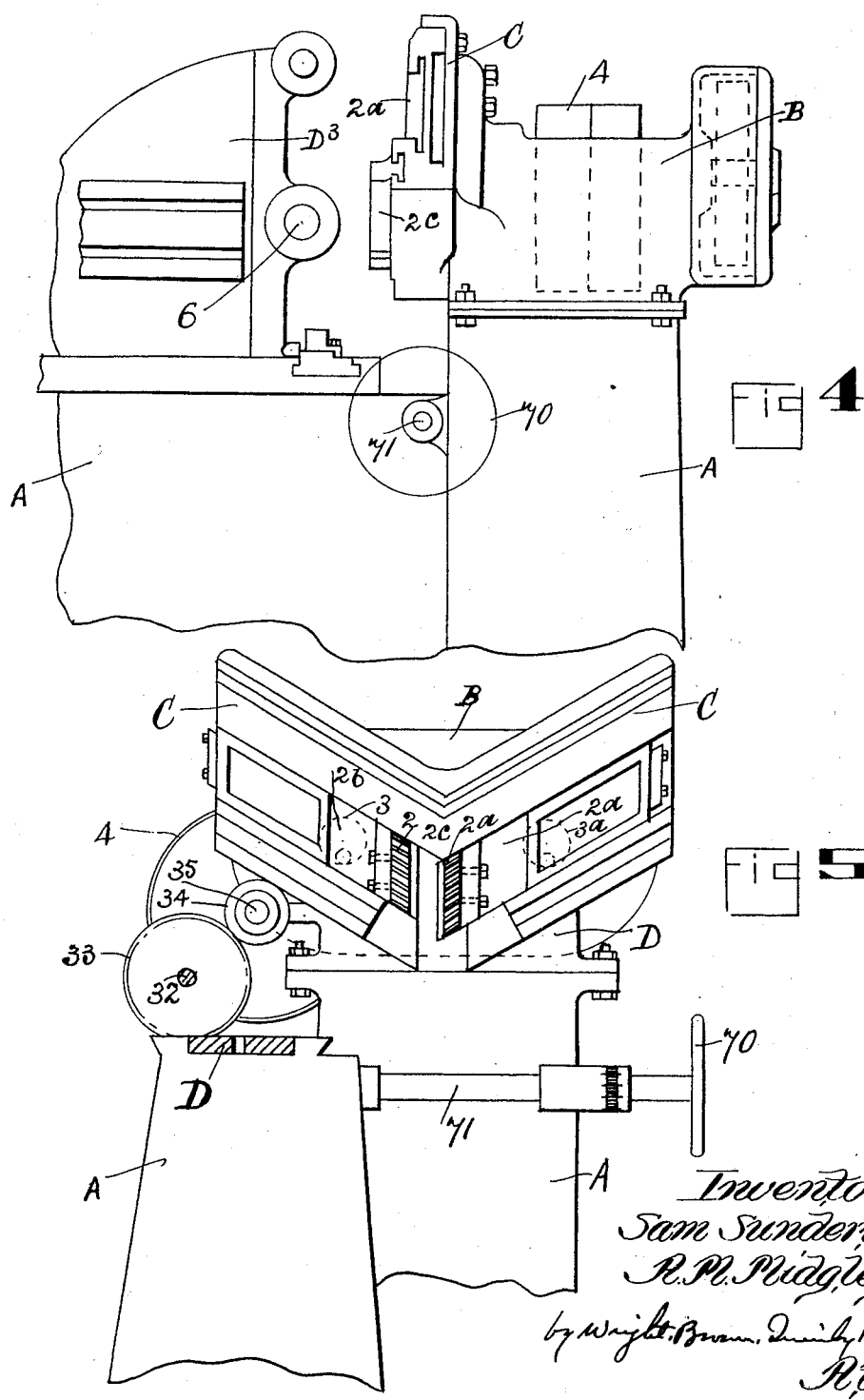

May 9, 1933.  S. SUNDERLAND ET AL  1,908,195
MACHINE FOR GENERATING THE TEETH OF WHEELS
Filed Feb. 27, 1931    5 Sheets-Sheet 4
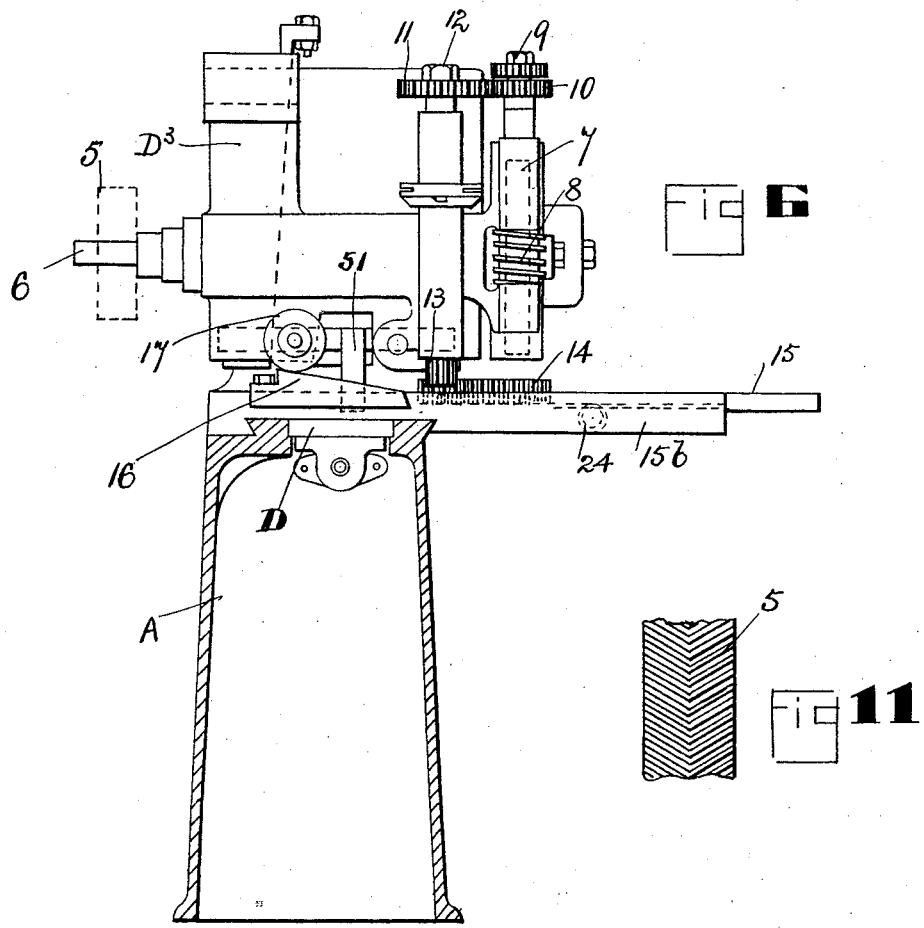
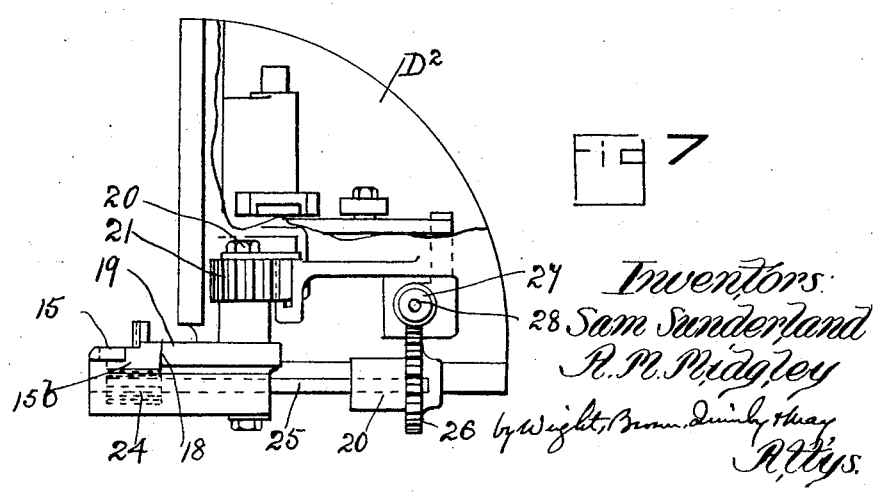

May 9, 1933.  S. SUNDERLAND ET AL  1,908,195
MACHINE FOR GENERATING THE TEETH OF WHEELS
Filed Feb. 27, 1931    5 Sheets-Sheet 5
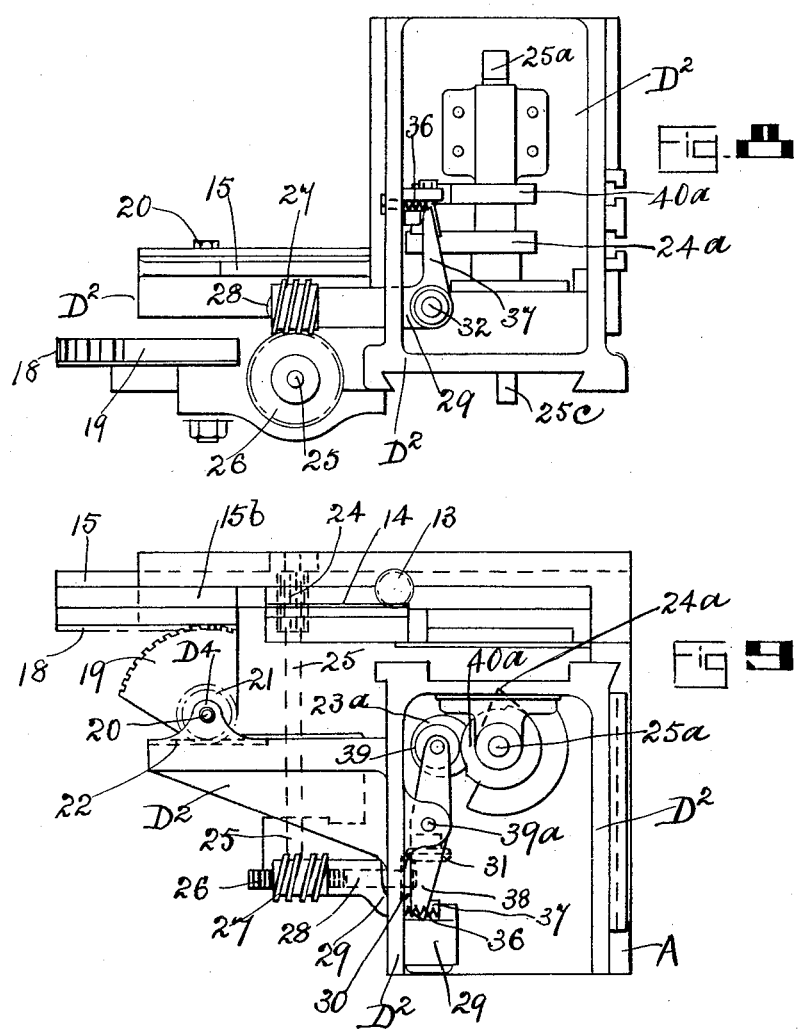
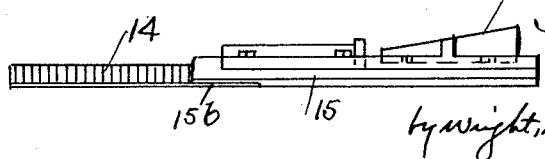

Patented May 9, 1933

1,908,195

UNITED STATES PATENT OFFICE

SAM SUNDERLAND, OF LYNDHURST, KEIGHLEY, AND ARTHUR MAURICE MIDGLEY, OF THRESHFIELD, NEAR SKIPTON, ENGLAND

MACHINE FOR GENERATING THE TEETH OF WHEELS

Application filed February 27, 1931, Serial No. 518,650, and in Great Britain May 30, 1930.

This invention relates to the type or class of machine for cutting or generating the teeth of wheels wherein the cutters are of the class or type known as rack cutters, that is to say a series of cutting teeth are joined together upon one base to form a rack or series of teeth, which rack is moved crosswise the blank, while the blank is moved radially towards the cutter as well as said blank being rotated about its axis in order that the generated teeth may be of the desired profile. And our present invention consists in the production and application of mechanism or devices whereby the time usually lost in the idle movements of the cutter is greatly reduced, while the said cutters are brought into action with greater precision so that the speed of the machine may be greatly increased while yet effecting or carrying out the functions of generating teeth efficiently.

In the accompanying sheets of drawings which are illustrative of our invention:—

Fig. 1 is a front elevation showing the general arrangement and formation of the machine.

Fig. 2 is a plan of the parts shown by Fig. 1 but with the exception that certain parts are omitted in order that others beneath same may be more clearly illustrated.

Fig. 3 is an elevation similar to Fig. 1, but in addition to certain of the framework shows only the blank supporting and operating devices hereinafter described.

Fig. 4 is an elevation similar to Fig. 3 but shows parts that are missed from the right hand portion of Fig. 3.

Fig. 5 shows in elevation certain of the parts as seen looking from left to right of Figure 2, a part of the machine being shown in section.

Fig. 6 shows in elevation certain of the parts as seen looking from right to left of Figure 2, a part of the machine being shown in section.

Fig. 7 is an elevation of a portion of the machine but seen in the opposite direction to that in which the same part of the machine is illustrated by Fig. 3, and with certain of the parts omitted.

Fig. 8 is an elevation of the upper parts of the machine shown by Figs. 2 and 3 and as seen looking from left to right of said Figs. 2 and 3.

Fig. 9 is a plan of the parts shown by Fig. 8.

Fig. 10 is an elevation illustrating a certain part for carrying out the advancing movements of the blank while being cut under the conditions hereinafter described, said parts being shown in the opposite direction on Fig. 6.

Fig. 11 is a drawing in detail showing the form of double helical teeth that can be cut or generated by the mechanism illustrated by the other figures.

Fig. 12 is a drawing in detail showing the formation of a sliding bar employed for controlling the motions of mechanism hereinafter described.

Fig. 13 is a drawing in detail showing a crank shaft for operating certain parts of the machine as is hereinafter explained.

Fig. 14 is a plan of the parts shown by Figs. 12 and 13.

A indicates the bed or supporting members upon which the operating parts are mounted in known manner and which rest upon the ground or floor.

B indicates the framework or supports for the driving pulleys and crank shafts which are mounted thereon and are operated in manner well known.

C indicates the member fixed upon the framework member B to form the slide or support for the reciprocating cutters as is hereinafter described.

D indicates a base plate which slides upon the framework A and is operated by hand adjusting means hereinafter described, while it, said base plate D, supports framework $D^2$ that slides upon it under the actions of a crank hereinafter described, while on said member $D^2$ another supporting member $D^3$ supports the shaft upon which the blank that has to have teeth generated upon its periphery is fixed.

In carrying our invention into effect we make use of the usual reciprocating slides 2 and 2a, (see Fig. 5) which carry the rack cutters 2b and 2c respectively and which are operated by two cranks deriving their motion from crank shafts 3 and 3a which are actuated by the fixed driving pulley 4 and the usual well known gearing in order that as said crank shafts 3 and 3a revolve they reciprocate the rack cutters 2b and 2c, one advancing while the other is receding in well known manner. Said rack cutters 2b and 2c are mounted on slides 2, 2a which are supported and guided by the fixed member C.

As is stated the blank 5 which has to have the teeth formed upon its periphery is mounted to be revolved and advanced horizontally and vertically to carry out the cutting operations under the desired conditions and in the usual manner, but by mechanism of the novel construction and arrangement described, in order that said blank is being moved, the cutters 2b, 2c are caused to travel crosswise said blank during the differential movements of same in order that by their combined actions the desired profile of tooth is produced.

The blank 5 upon which the teeth have to be generated is mounted upon a shaft 6 which extends crosswise the supporting member $D^3$ so that upon said shaft 6 a worm wheel 7 may be fixed in order that motion may be transmitted to it by a worm 8 mounted upon a vertical worm shaft 9 carried by bearings $D^3$ which slide upon the bearings $D^2$.

Upon the upper end of the shaft 9 is fixed the pinion 10 which gears with the intermediate pinions shown by Figs. 2 and 3 so that by the wheel 11 (which is fixed upon a vertical shaft 12) motion may be transmitted to said shaft 12 in order that a pinion 13 at the lower end of said shaft may engage with a rack 14 fixed upon a sliding member 15.

Fixed upon this member 15 is an inclined or wedge member 16 so that as said slide 15 is advanced by the actions of the pinion and rack 13 and 14 said inclined member 16 will raise the runner 17 which rests upon it in order that this may lift or cause to rise the bearings $D^3$ mounted to slide over the bearings $D^2$ upon which the member 15 slides, thereby carrying the blank 5 and the parts that actuate said blank 5 vertically to give shape or form to the tooth as is hereinafter explained.

The widths of the pinion 13 and rack 14 are such as to permit said rising and falling movements on the part of the member $D^3$ which carries the operating devices described without said pinion 13 becoming disengaged with the rack 14.

To the rear of the slide 15 is formed and secured a rack 18 and this rack 18 as it is advanced (by the actions of the pinion 14 operating the slide 15 as described) actuates a toothed quadrant 19 which is fixed upon a vertical shaft 20 which is supported in bearings $D^4$ forming part of the bearing $D^2$.

Upon this shaft 20 is fixed a quadrant 21 which meshes or gears with a rack 22 which will slide longitudinally through the bearings $D^4$ to carry a runner 23a into engagement with a cam 24a fixed upon a vertical shaft 25a in order that said shaft may effect the reverse movement of the rack 22 and all the parts operating in conjunction with said rack 22 in the manner and for the purpose hereinafter described.

The slide 15 has also another or third series of rack teeth 15b formed upon it and these extend downwardly so that they may engage with a pinion 24 fixed on a shaft 20 which derives its motion from a worm wheel 26 which is fixed thereon. This worm wheel 26 engages with a worm 27 fixed upon a horizontal shaft 28 which is carried by bearings 29 so that at the inner end of said shaft 28 a bevel wheel 30 may be fixed to it. This bevel wheel 30 is arranged to gear with a bevel wheel 31 fixed upon the main driving shaft 32 which derives its motion through the gearing wheels 33 and 34, the latter being fixed upon the shaft 35 upon which are mounted the driving pulleys 4 through which all the motions of the machine are derived.

The shaft 28 upon which the worm 27 is fixed, is mounted in the bearings 30 and these bearings 30 are pivoted to swivel upon other bearings 29 by cam action (hereinafter explained) so that when said worm 27 is raised out of gear or mesh with the wheel 26 to which it has to transmit motion, such raising out of action disengages same to permit the reverse motion of the shaft 25 and wheel 26 to be carried out under the conditions hereinafter explained.

The normal position of the worm 27 when in engagement with the wheel 26 is secured by a spring 36 actuating and normally retaining the lever arm 37 in its rearward position shown by Fig. 8 so that said position of the arm 37 secures the position of the bearing 29 with the worm 27 in engagement with the wheel 26.

Engaging with the upper end of the arm 37 is an outward arm 38 (Fig. 9) of a lever which is pivoted at 39a upon supports carried by the member $D^2$, while at the other end of this lever 38 is pivotally mounted a bowl or runner 39 which is for engagement with a cam 40a (Figs. 8 and 9) fixed upon the vertical shaft 25a.

The vertical shaft 25a has mounted upon it a worm wheel 40 which is of the construction hereinafter described and which is to act in connection with a member shown in detail by Figs. 12, 13 and 14.

The wheel 40 derives its motion from a worm 41 that is fixed upon the main driving shaft 32 so that at all times when the driving belt is on the fast driving pulley 4 motion will be transmitted to the main shaft 32 and therefore to the worm wheel 40, although the disengagement of this worm wheel 40 from the shaft 25a which it has to drive is effected in the manner and for the purpose hereinafter described.

As is above stated the worm wheel 40 is mounted so that it will revolve loosely about the shaft 25a but is intermittently keyed to said shaft by a radially sliding key 25w which is mounted in a groove in the shaft 25a as is shown by Figs. 13 and 14.

This key 25w is retained within the groove of the shaft 25a by taking against the surface of the central opening of the wheel 40, as is shown by Fig. 14, while by the springs s and s¹ said key 25w is always pressed radially so that when free its outer edge will move beyond the peripheral surface of the shaft 25a within the groove of which it is retained and guided by a projection 25x extending into an opening in said shaft 25a.

The spring actuated key 25w as is stated is retained within the shaft 25a during certain parts of the motion of the machine for the purpose hereinafter described, while the said retaining of the key 25w in said position is effected by a sliding bar 50 which slides longitudinally crosswise the bearings D² and is held against the periphery of the shaft 25a as is shown by Figs. 13 and 14.

This sliding bar 50 (Figures 12, 13 and 14) has a notch 50a which permits the key 25w to move radially beyond the shaft 25a when said notch comes opposite said key 25w and when such movement of the key 25w is permitted it engages with the teeth 61 which are formed inwardly through the opening of the wheel 25a so that their outer ends will rest upon the shaft 25a while affording spaces for the entrance of the key 25w.

Extending laterally from the bar 50 is a downwardly projecting member 51 which extends into the path of motion of two projections 15w and 15x from the rack bar 15. Thus as said rack bar 15 is advanced or moved to operate the inclined member 16 to raise the member D³ as above described, it also carries forward the notched bar 50 until said bar 50 is brought with its notch 50a beyond the key 25w, at which time the springs that actuate said key are free to force said key into the notch 50a and therefore to permit the lower edge of the key to engage with the internal teeth 61 on the internal opening in the wheel 40, at which time as the shaft 32 is continuously moving and rotating its worm 41 the rotary motions of said worm 41 will commence to rotate the shaft 25a and cause same to complete one revolution. The completion of this revolution is arranged to take place simultaneously with the return actions of the bar 50 as effected by the actions of the sliding rack bar 15, so that during said actions the solid part of the bar 50 will have receded so far that the sliding key 25w will come in contact with it and be forced to the interior of the shaft 25a and therefore out of engagement with the teeth 61 of the wheel 40.

The said single revolution of the shaft 25a carries with it a crank pin 25c and this crank pin 25c operates in a sliding block which slides crosswise a slot in the fixed plate D. Thus the sliding part D² which carries the vertical shaft 25a and all parts in connection therewith, is caused to recede from being in position near the cutters 2 and 2a in order to bring the blank 5 clear of said cutters, so that the falling or descending of the blank with the descent of the sliding member D³ carries with it the said blank, during the time it is entirely clear of the cutters.

This receding and descending of the parts described is effected during one half of the revolution of the crank 25c, while the next half of the revolution of said crank 25c carries the parts D² and all that are fixed thereto, back to their normal positions for the cutting operations to be continued after the adjustment of all the other parts is carried out.

The adjusting of the sliding plate D and all the members carried thereby including the blank carrier shaft 6 in order to enable them to carry out the functions of any particular size of blank 5 that may be mounted in position for treatment, is effected by the attendant actuating the hand wheel 70, shaft 71, bevel wheels 72 and 73 and screw 74, as is shown by Fig. 2, and which is a well known arrangement of mechanism.

The sliding of the supporting member D² and other parts carried by said member for removing the blank from its position where it is operated upon by the cutters and back again to such position is permitted by the main shaft 32 having a key-way upon which its driving wheel 33 slides so that the shaft 32 moves longitudinally backward and forward along with the members D² and all the other parts operated thereby.

The operations of the foregoing parts are as follows:—

When the attendant has adjusted the blank 5 in its position by the employment of the hand wheel 70 and parts operated thereby and the machine is started into motion, as the cutters 2 and 2a are reciprocated crosswise over the periphery of the blank 5 the rack bar 15 is advanced by the actions of the worm 27, wheel 26 and shaft 25 moving the pinion 24 which engage with downwardly extending rack teeth on the bar 15 so that as the advancing motion of said bar 15 proceeds the projection 15x will engage with the projection 51 on the bar 50 and advance said bar as the cutting operations proceed. The advancing of the rack bar 15 also carries out the movement of the inclined lifting member 16 which raises the member D³ and causes the operations hereinbefore described. And these continue the desired period in accordance with the prearranged number of cuts to be taken, and simultaneously with the movements of the quadrant 19 (which movements are effected by the continued sliding of the rack bar 15 engaging with said quadrant 19) so that the pinion 20 actuated by said quadrant 19 operates another rack bar 22 to bring a bowl or runner 23a into engagement with the cam 24a on the shaft 25a. The movement of the said runner 23a into the position stated is made to synchronize with the advancing movement of the bar 50 so that the engagement of the runner 23a with the cam 24a on the shaft 25a synchronizes with the reaching of the position where the notch 50a is opposite the key 25w in order that immediately said key 25w is liberated by the said notch 50a its engagement with the wheel 40 gives one revolution to the shaft 25a as is hereinbefore described and this one revolution of the shaft 25a carries the cam 24a through one revolution and therefore reverses the movement of the rack 22 and consequently the pinion 20, and quadrant 19. By these actions the rack 15 is reversed as is also the rack which transmits motion to the pinion 13 and the gearing wheels 12. These operations commence and finish when each complete tooth has been generated on the periphery of the blank 5.

It will be observed that the construction and arrangement of the mechanism for carrying out the generating actions of the rack-cutters, are described to be such that while the blank is revolving in the paths of the cutters it is also being raised so that a vertical movement relative to the plane in which the cutters effect their cutting operations is in a path tangential to the periphery of the blank.

This method of operation we have found to be efficient, but we have also found it to be efficient when the tangential movements of the blank are reversed, that is to say, are caused to descend instead of rising during the effective actions of the rack-cutters.

The sliding members, which carry the rack-cutters into engagement with the blank in order to effect the cutting actions, are arranged also to carry devices which permit the said cutters to recede rearwardly from said blank when returning to their positions for restarting their cutting actions when again advanced in manner well known.

In the foregoing description the rack-cutters are shown to be for the formation for generating helical teeth and are arranged to cut that type of same styled "double-helical" teeth; however it is well known how to form, to arrange and to operate said rack-cutters so that single-helical teeth, of even spur teeth may be generated and our new construction and arrangement of devices hereinbefore described permit the adjustments and regulations of the parts necessary for carrying out the same functions.

Such being the nature and object of our said invention what we claim is:—

1. In a machine for generating the teeth of wheels, a rotary shaft upon which the blank to form the wheel is fixed, movable supports or bearings for said rotary shaft, gearing for transmitting motion to said rotary shaft positively to feed same, cutters of the rack type to which the blank is fed by said shaft, a sliding cam surface for effecting the movements of the bearings for the rotary shaft to carry the blank against the cutters, means for positively advancing said cam surface to effect the movements of the bearings carrying the shaft, mechanism for disengaging the devices which effect the advancing of the sliding cam surface, engaging mechanism for transmitting reverse motion to the said sliding cam surface, means for actuating said engaging and disengaging devices, including cam mechanism connected so as to operate in unison with the gearing which operates the sliding cam surface, driving gear for transmitting rotary motion to the shaft upon which the said cam is fixed to carry same through one revolution and connecting devices whereby said cam reverses and readjusts in their initial positions the gearing and operating mechanism for actuating the sliding cam surface.

2. In a machine for generating the teeth of wheels, a rotary blank carrying shaft upon which the blank to form the wheel is fixed, movable supports or bearings for said rotary shaft, gearing for transmitting motion to said rotary shaft positively to feed same, cutters of the rack type to which the blank is fed by said shaft, a sliding bar having a cam surface for effecting the movements of the bearings for the rotary shaft to carry the blank against the cutters, a rack for positively advancing the said cam surface to move the bearings supporting the shaft carrying the blank, another rack for effecting the reverse movement of the said sliding cam surface, a sliding bar arranged to be actuated by the two sliding racks, a cam shaft, a catch device actuated by said sliding bar to connect the cam shaft with and disconnect it from shaft driving means, a cam fixed upon said cam shaft, and means for transmitting motion to said cam shaft through one revolution, and connecting devices whereby said cam reverses and readjusts, in their initial positions, the gearing and operating mechanism for actuating the sliding cam surface.

3. In a machine for generating the teeth of wheels, a rotary shaft upon which the blank to form the wheel is fixed, movable supports or bearings for said rotary shaft, gearing for transmitting motion to said rotary shaft positively to feed same, cutters of the rack type to which the blank is fed by said shaft, a sliding cam surface for effecting movements of the bearings for the rotary shaft to carry the blank against the cutters, mechanism for positively advancing said cam surface to effect the movements of the bearings carrying the shaft, including means for disengaging the devices which effect the advancing of the sliding cam surface, engaging mechanism for transmitting reverse motion to the said sliding cam surface, means for actuating said engaging and disengaging devices, including cam mechanism connected so as to operate in unison with the gearing which operates the sliding cam surface, a sliding catch bar actuated by the sliding cam surface, a rotary shaft adjoining said catch bar, a gearing wheel mounted to rotate loosely upon said shaft during the reverse motions of the sliding cam, clutch mechanism actuated by the sliding catch bar for engaging said wheel to the shaft and connections from said rotary shaft arranged so that a cam fixed thereon will effect all the reverse movements during one revolution of said cam, said cam and devices actuated thereby for effecting the reverse movements of the sliding cam to readjust same in its initial position.

4. In a machine for generating the teeth of wheels, a rotary shaft upon which the blank to form the wheel is fixed, movable supports or bearings for said rotary shaft, gearing for transmitting motion to said rotary shaft positively to feed same, cutters of the rack type to which the blank is fed by said shaft, a sliding cam surface for effecting the movements of the bearings for the rotary shaft to carry the blank against the cutters, a rack for positively advancing the said cam surface to move the bearings supporting the shaft carrying the blank, another rack for effecting the reverse movement of the said sliding cam surface, gearing connected to the main shaft of the machine for positively moving one of the racks carrying a sliding cam in its advancing direction, devices for effecting disengagement of said gearing at a predetermined time, another rack for effecting the reverse motion of the sliding cam, said rack being actuated from the main shaft of the machine actuating a vertical shaft carrying a cam, devices coupling said cam to the rack and means for actuating said devices.

5. In a machine for generating the teeth of wheels, a rotary shaft upon which the blank to form the wheel is fixed, movable supports or bearings for said rotary shaft, gearing for transmitting motion to said rotary shaft positively to feed same, cutters of the rack type to which the blank is fed by said shaft, a sliding cam surface for effecting movements of the bearings for the rotary shaft to carry the blank against the cutters, means for positively effecting the advancing and return movements of the said cam surface, mechanism for disengaging the devices which effect the advancing of the sliding cam surface, a cam shaft arranged to be driven by the main driving shaft of the machine, a cam fixed on said cam shaft, a gearing wheel with clutch mechanism for engaging said shaft, means for actuating said clutch mechanism so that the cam shaft is rotated through one revolution at each of its movements, a crank fixed upon said cam shaft to effect the advancing and receding movements of the bearings which support the shaft carrying the blank so as to move same into and out of the path of the cutters and sliding bearings for supporting said devices.

6. In a machine for generating the teeth of wheels, a rotary shaft upon which the blank to form the wheel is fixed, movable supports or bearings for said rotary shaft, gearing for transmitting motion to said rotary shaft positively to feed same, cutters of the rack type to which the blank is fed by said shaft, a sliding cam surface for effecting the movements of the bearings for the rotary shaft to carry the blank against the cutters, means for positively advancing said cam surface to effect the movements of the bearings carrying the shaft, mechanism for disengaging the devices which effect the advancing of the sliding cam surface, engaging mechanism for transmitting reverse motion to the said sliding cam surface, a vertical shaft, a cam fixed on said shaft, a gearing wheel mounted to revolve loosely upon said shaft during one period and clutch mechanism for engaging said wheel to the shaft during another period, means for transmitting motion to said wheel at a relatively increased speed to that at which the sliding cam moves in its advancing direction, means for transmitting the increased speed for returning the operating devices of the machine to their initial positions.

7. In a machine for generating the teeth of wheels, a rotary shaft upon which the blank to form the wheel is fixed, movable supports or bearings for said rotary shaft, gearing for transmitting motion to said rotary shaft positively to feed same, cutters of the rack type to which the blank is fed by said shaft, a sliding cam surface for effecting movements of the bearings for the rotary shaft to carry the blank against the cutters, means for positively advancing said cam surface to effect the movements of the bearings carrying the shaft, mechanism for disengaging the devices which effect the advancing of the sliding cam surface, engaging mechanism for transmitting reverse motion to the said sliding cam surface, cam mechanism connected so as to operate in unison with the gearing which operates the sliding cam surface, driving gear for transmitting rotary motion to the shaft upon which the said cam is fixed to carry same through one revolution, connecting devices whereby said cam reverses and readjusts in their initial positions the gearing and operating mechanism for actuating the sliding cam surface and manually operated gearing whereby the attendant may adjust the blank in the desired position relative to the cutters.

SAM SUNDERLAND.
ARTHUR MAURICE MIDGLEY.